United States Patent [19]
Masek et al.

[11] Patent Number: 5,996,427
[45] Date of Patent: Dec. 7, 1999

[54] LIQUID SAMPLE STORAGE DEVICE

[75] Inventors: James P. Masek; John D. Hull; Robert L. Haahr, all of Lincoln, Nebr.

[73] Assignee: ISCO, Inc., Lincoln, Nebr.

[21] Appl. No.: 09/127,445

[22] Filed: Jul. 31, 1998

Related U.S. Application Data

[60] Division of application No. 08/779,881, Jan. 6, 1997, Pat. No. 5,789,684, which is a continuation-in-part of application No. 08/586,447, Jan. 16, 1996, abandoned.

[51] Int. Cl.$^6$ .................................................. G01N 1/10
[52] U.S. Cl. ..................................... 73/864.91; 73/863.52
[58] Field of Search ........................... 73/864.91, 864.51, 73/863.52, 864.62, 864.63; 141/316

[56] References Cited

U.S. PATENT DOCUMENTS

| | | | |
|---|---|---|---|
| 3,255,932 | 6/1966 | Hunter et al. | 222/183 |
| 3,635,091 | 1/1972 | Linzer et al. | 604/709 X |
| 3,746,240 | 7/1973 | Flynn | 229/14 B |
| 3,830,107 | 8/1974 | Linzer et al. | 73/863.52 |
| 3,866,474 | 2/1975 | Hasselmann | 73/864.62 |
| 3,885,467 | 5/1975 | Merkin | 141/316 X |
| 3,943,770 | 3/1976 | McDonald | 73/863.52 |
| 4,018,911 | 4/1977 | Lionetti et al. | 424/533 |
| 4,151,929 | 5/1979 | Sapien | 220/404 |
| 4,154,387 | 5/1979 | Booth et al. | 141/316 X |
| 4,280,538 | 7/1981 | Hazelbaker | 141/316 X |
| 4,490,882 | 1/1985 | Wells | 15/337 |
| 4,539,026 | 9/1985 | Kuplos | 55/376 |
| 4,548,087 | 10/1985 | Huck | 73/863.57 |
| 4,582,606 | 4/1986 | McCarty | 210/516 |
| 4,760,982 | 8/1988 | Cooke | 141/316 X |
| 4,925,056 | 5/1990 | McCoig | 220/404 |
| 4,940,581 | 7/1990 | Mason et al. | 424/532 |
| 5,022,693 | 6/1991 | Loveloss | 294/1.1 |
| 5,096,093 | 3/1992 | Wells | 222/95 |
| 5,210,994 | 5/1993 | Lynn | 53/469 |
| 5,291,779 | 3/1994 | Govoni et al. | 73/170.17 |
| 5,341,693 | 8/1994 | Banu | 73/864.67 |
| 5,369,034 | 11/1994 | Horgett et al. | 436/155 |
| 5,379,810 | 1/1995 | Marino et al. | 141/313 X |
| 5,390,553 | 2/1995 | Lynn | 73/864.91 |
| 5,460,299 | 10/1995 | Prause | 222/213 |
| 5,863,715 | 1/1999 | Rajotte et al. | 435/1.3 |

FOREIGN PATENT DOCUMENTS

| | | | |
|---|---|---|---|
| 61868 | 10/1982 | European Pat. Off. | A61J 9/08 |
| 1205791 | 2/1960 | France . | |
| 1287487 | 2/1962 | France . | |

*Primary Examiner*—Thomas P. Noland
*Attorney, Agent, or Firm*—Henderson & Sturm

[57] ABSTRACT

A liquid sample storage device which utilizes a liner-holder with a liner which may be disposed of after use, thereby eliminating contamination problems associated with reusable bottles. The liner-holder is a hollow, wedge shaped container with an upwardly extending neck section and vents on the top and bottom, as well as a plurality of vents on each of its sides, to allow adequate displacement of air from within the container as the liner fills with the liquid sample. Two embodiments utilize a liner-holder which may be opened into two sections along a vertical hinge to provide access to the interior for proper positioning and later removal of the liner. The liner is positioned within the liner-holder, secured at the neck, and then suspended within the liner-holder by snap-locks or a support hook to facilitate the input of the sample into the liner.

6 Claims, 7 Drawing Sheets

LIQUID SAMPLE STORAGE DEVICE

CROSS-REFERENCE TO RELATED APPLICATIONS

This application is a divisional of application Ser. No. 08/779,881 filed Jan. 6, 1997, now U.S. Pat. No. 5,789,684, which application was a Continuation-in-Part of application Ser. No. 08/586,447, filed Jan. 16, 1996, now abandoned, the disclosures of which are hereby incorporated by reference.

STATEMENT REGARDING FEDERALLY SPONSORED RESEARCH OR DEVELOPMENT

Not Applicable.

AUTHORIZATION PURSUANT TO 37 C.F.R. §1.71(d) (e)

A portion of the disclosure of this patent document, including appendices, may contain material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

This invention relates to liquid sampler devices, and more particularly to an improved liquid sample storage device which utilizes a disposable liner.

2. Description of the Related Art

Fluid sampling devices are well known in the art and are generally utilized to obtain samples of wastewater, water from rivers or streams, or liquid effluent from commercial or manufacturing enterprises for subsequent testing in order to determine the levels of various pollutants. These devices generally function with timers and withdraw samples periodically which are then deposited into sample storage devices for subsequent transportation to a testing facility.

Most prior art sample storage devices are either glass or plastic bottles, which must be thoroughly washed after each collection to prevent contamination of subsequently collected samples. Glass containers are, of course, undesirable in that they are susceptible to breakage. On the other hand, plastic containers are much more difficult to clean than are glass containers. U.S. Pat. No. 5,390,553, issued to Lynn, attempts to resolve some of these difficulties by utilizing a container which holds a plastic bag therein. The container splits into upper and lower sections for insertion of the bag, which is held in position by a retainer ring around the neck section of the container. A single vent hole in the neck of the container is utilized to allow trapped air to escape from the container as the bag fills with liquid sample.

Testing of the Lynn device, however, has demonstrated that its operation is less than satisfactory inasmuch as the single vent hole is insufficient to allow the internal bag or liner to fill properly. As the liner fills, air becomes trapped in areas removed from the vent hole and prevents the bag from filling. Furthermore, the bag of Lynn is simply placed within the container with the neck of the bag folded down over the neck of the container and provides no structure for suspending the bag in an open configuration to facilitate the deposit of fluid samples therein.

Those concerned with these and other problems recognize the need for an improved fluid sample storage device.

DISCLOSURE OF THE INVENTION

The present invention provides a liquid sample storage device which utilizes a liner-holder with a liner which may be disposed of after use, thereby eliminating contamination problems associated with reusable bottles. The liner-holder is a hollow, wedge shaped container with an upwardly extending neck section. The liner-holder has vents on the top and bottom, as well as a plurality of vents on each of its sides to allow adequate displacement of air from within the container as the liner fills with fluid. A first embodiment of the liner-holder may be opened into two sections along a vertical living hinge to provide access to the interior for proper positioning and later removal of the liner. The liner is positioned within the liner-holder at three of its corners by use of snap-lock tabs on the liner which engage snap-locks on the liner-holder. The remaining corner of the liner includes an elongate inlet neck which is folded down over the neck of the liner-holder and secured by a retainer. A second embodiment of the invention is originally molded into an open configuration for economic considerations, but is then folded into a closed configuration along a series of hinge straps and held closed by means of four bayonet clips. The liner is held in position within the liner-holder by securing a liner support tab to a support hook adjacent the upper vent hole of the liner-holder and by folding the neck of the liner down upon the neck of the liner-holder. A simplified third embodiment of the invention is not hinged as are the first two embodiments and requires insertion and removal of the liner through the bottom of the liner-holder. In this third embodiment, the liner is held in place within the liner holder by a retainer and the support tab and hook of the second embodiment.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
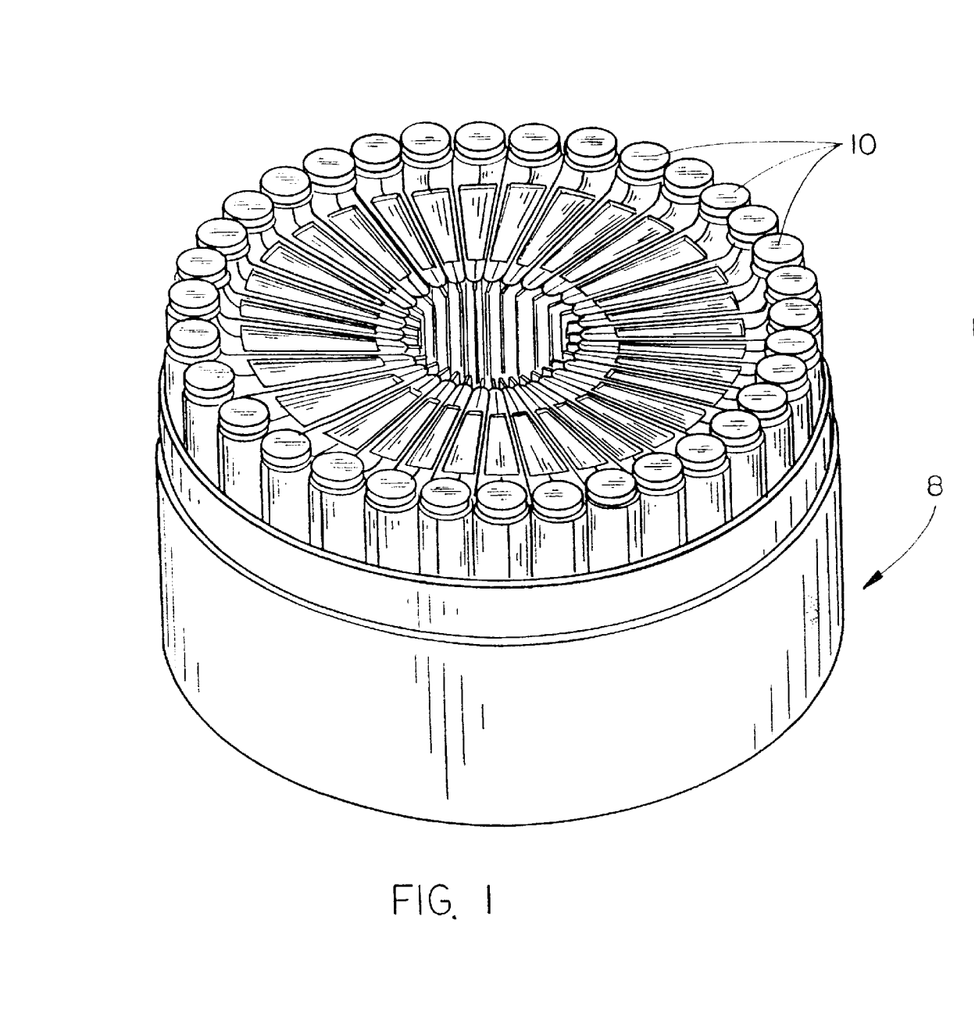
FIG. 1 is a perspective view of the base of a standard sample collection device containing a plurality of sample storage devices of the present invention.
Figure 2:
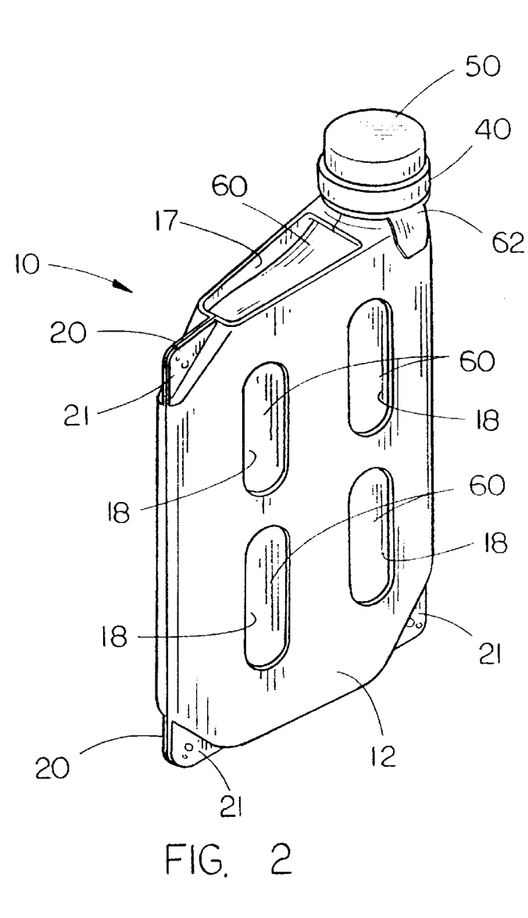
FIG. 2 is a perspective view of a first embodiment of the sample storage device of the present invention.

Referring now to the drawings, wherein like reference numerals designate identical or corresponding parts throughout the several views, FIG. 1 depicts a typical liquid sample collection tray 8 containing a number of sample storage devices 10 of the present invention. A first embodiment of the invention 10 is shown in FIG. 2, removed from the collection tray 8 and with a cap 50 in place as would be necessary if the sample is to be stored or transported within the storage device 10 as would ordinarily be the case. In the alternative, the disposable liner 60 can be removed from the liner-holder 12 and closed by heat sealing or a twist tie, leaving the liner-holder 12 available for immediate further use.

Figure 3:
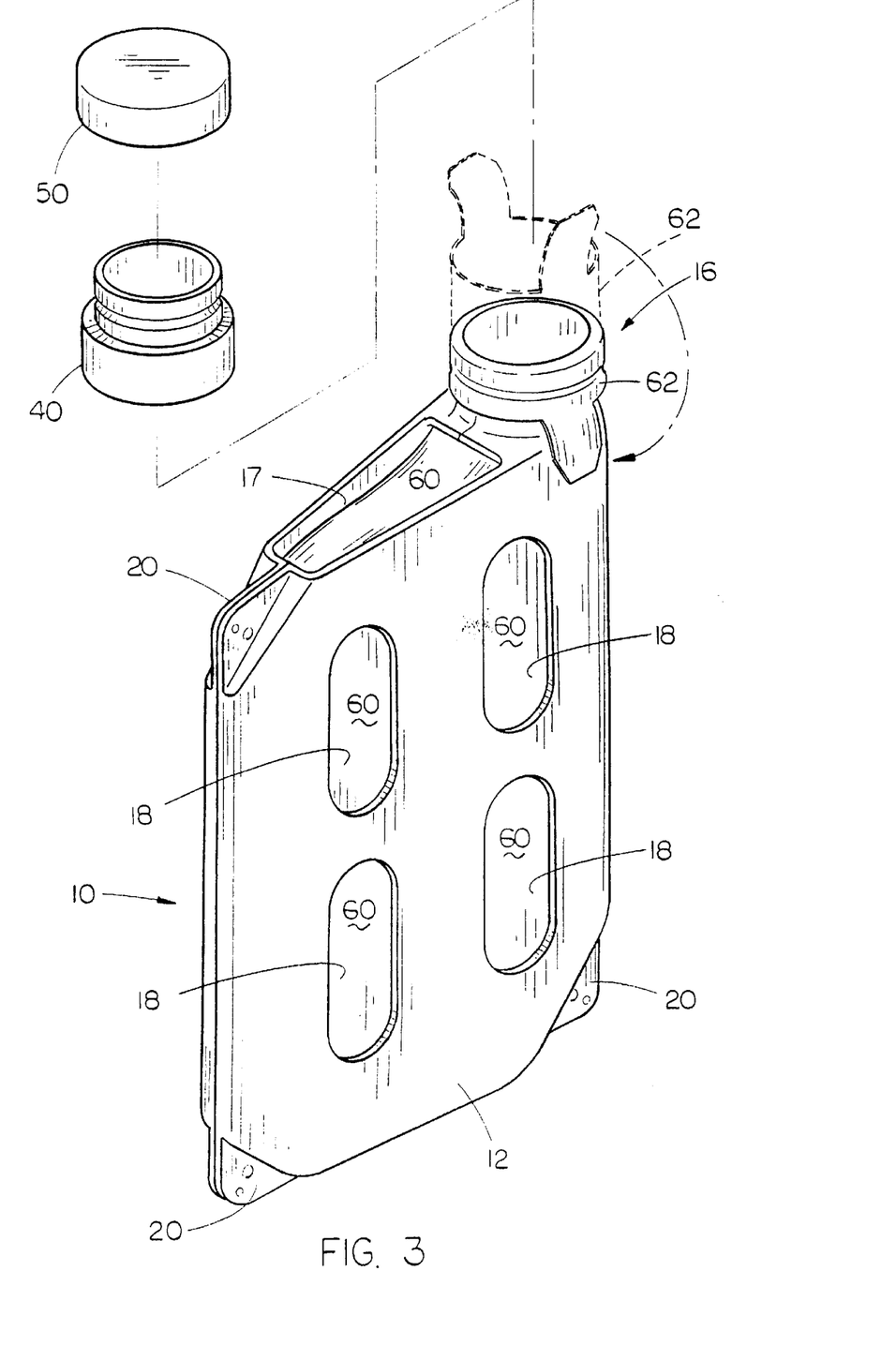
FIG. 3 is a perspective view of the first embodiment with the liner retainer and cap removed.
Figure 4:
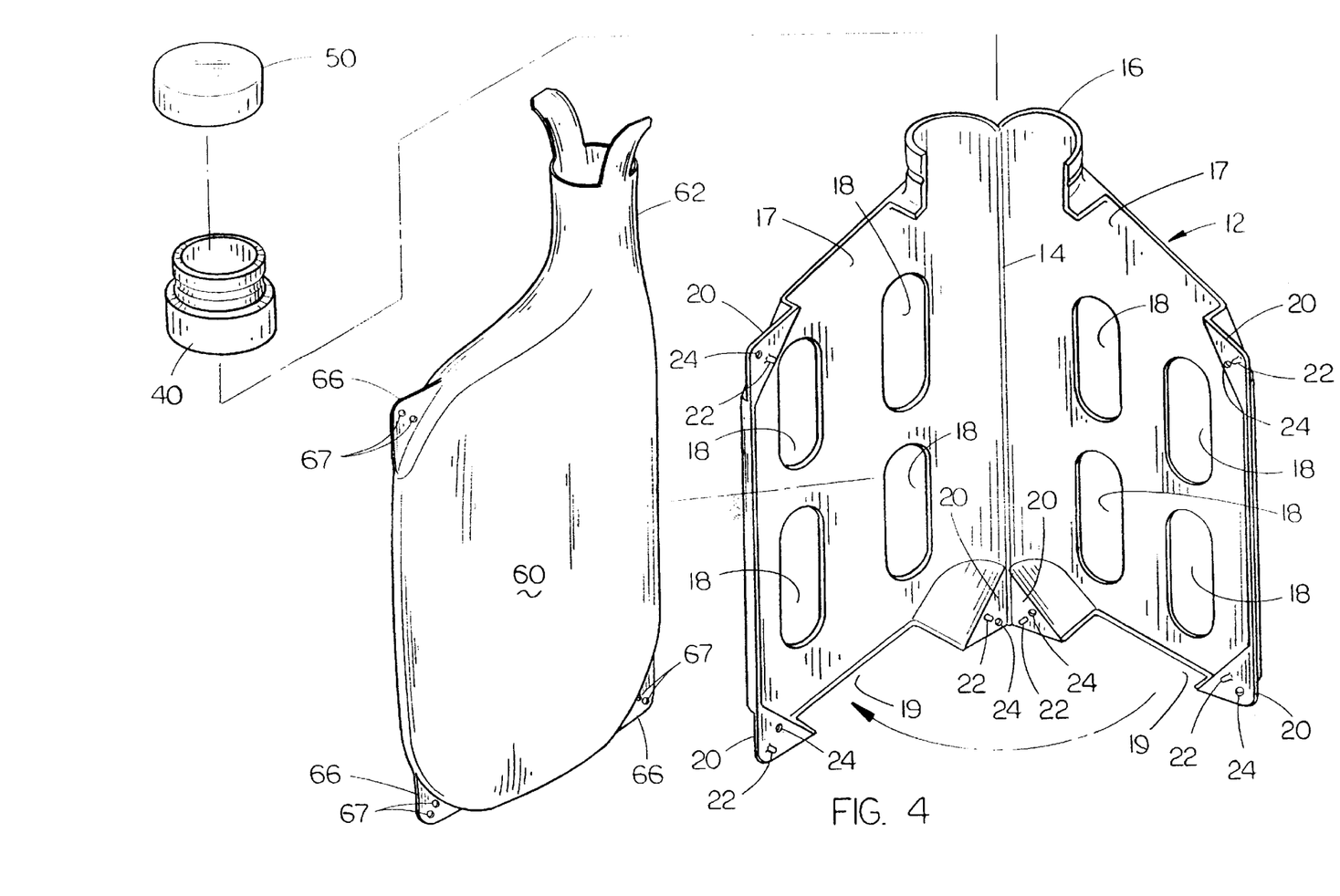
FIG. 4 is an exploded perspective view of the first embodiment with the liner-holder in the open configuration and the disposable liner removed.
Figure 6:
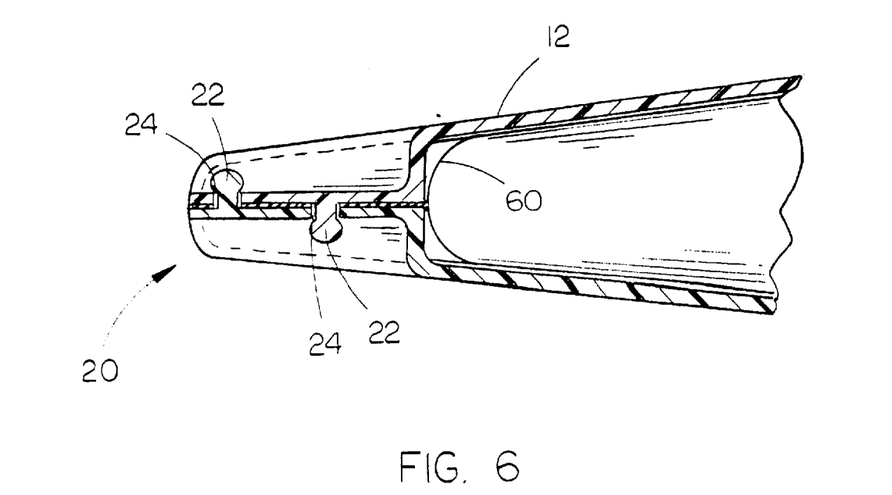
FIG. 6 is a sectional view through a snap-lock of the liner-holder and depicts its engagement with a liner snap-lock tab.

Referring now to FIG. 4, the invention is shown with the liner-holder 12 in the open configuration in preparation for receiving a liner 60. The liner-holder 12, preferably fabricated from molded plastic, is a wedge shaped, hollow container which is split along a central vertical plane through the wedge, dividing it into two concave mirror image sections movably connected to each other by a living hinge 14 formed during the molding process. Referring also to FIG. 3, in the closed configuration the liner-holder 12 has a cylindrical neck section 16, and vents 18 in the sides, a top vent 17, and bottom vent 19. The liner-holder 12 further includes a snap-lock 20 at each of the corners opposing the neck section 16 which serve to retain the liner-holder 12 closed as well as to support the liner 60 as will be further described below. A cross-sectional view of a snap-lock 20 is shown in FIG. 6 where it can be seen to include a pair of raised beads 22 for mating with a pair of opposing holes 24.

The liner 60 is preferably fabricated from thin polypropylene, polyethylene, or similar material, approximately 0.005 inches thick, and has an expanded shape which conforms to the interior of a closed liner-holder 12. The liner 60 has an inlet neck 62 which conforms to the interior of the neck section 16 of the liner-holder 12; however, the inlet neck 62 of the liner 60 is somewhat longer than the liner-holder neck section 16 so that it can be folded downwardly over the neck section 16 for securement thereto. The inlet neck 62 is shown in FIG. 3 in dashed lines before folding and in solid lines after folding. Referring again to FIG. 4, the liner 60 is seen to include a snap-lock tab 66 at each of its corners opposing the inlet neck 62. These snap-lock tabs 66 conform to the snap-locks 20 of the liner-holder 12 and provide a pair of holes 67 for engagement with the beads 22 of the snap-locks 20 as seen best in FIG. 6.

Figure 5:
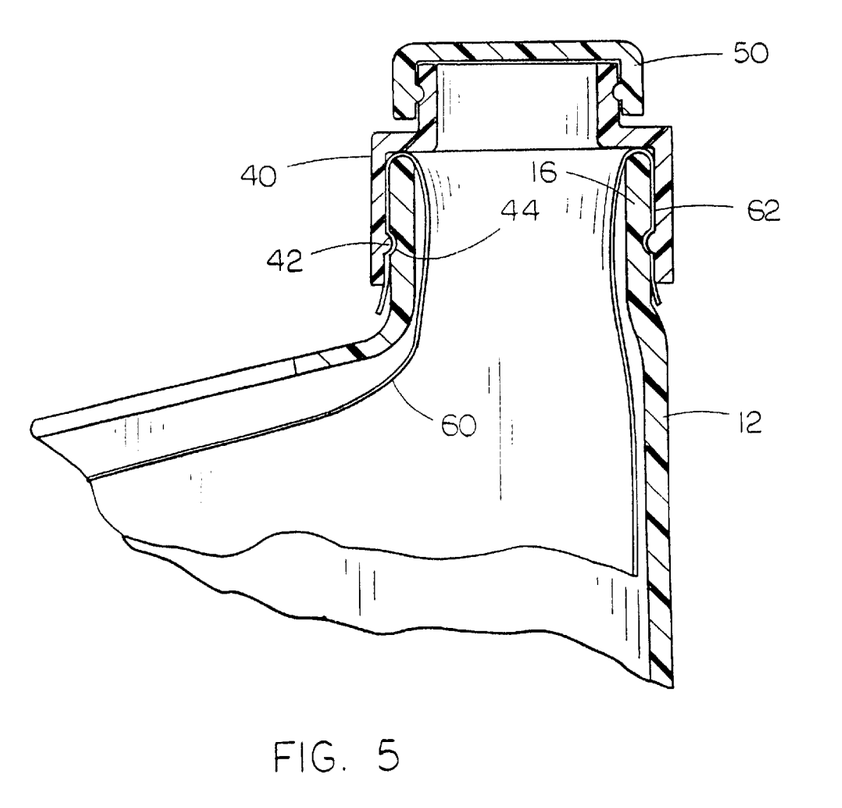
FIG. 5 is a sectional view through the neck of the first embodiment showing the liner engaged by a snap-on retainer, and showing a snap-on cap.

The first embodiment further comprises an annular retainer 40 provided with an interior annular bead 42 (FIG. 5) for engagement with an annular groove 44 formed around the neck section 16 of the liner-holder 12. As the retainer 40 is pressed over the neck section 16 of the liner-holder 12, it engages the downwardly folded neck 62 of the liner 60 to insure that the liner 60 remains properly positioned within the liner-holder 12. A cap 50 is also provided for securement upon the retainer 40 to seal the contents of the liner 60.

In operation, an empty liner-holder 12 is opened and a liner 60 is placed against one of the sides of the liner-holder 12, with the liner neck 62 extending through the holder neck section 16. Each of the three liner snap-lock tabs 66 are then placed against its counterpart snap-lock 20 for engagement of the bead 22 with a tab hole 67. The holder 12 is then closed with the snap-locks 20 engaging the liner snap-lock tabs 66. The liner neck 62 is then folded down over the holder neck section 16. A retainer 40 is then placed over the neck section 16, if necessary, to further support the liner 60 within the liner-holder 12. When the sample container is filled, a cap 50 is secured over the retainer 40 for transportation, or the liner 60 may be removed from the liner-holder 12 and sealed for transportation, leaving the liner-holder 12 for further use.

Figure 7:
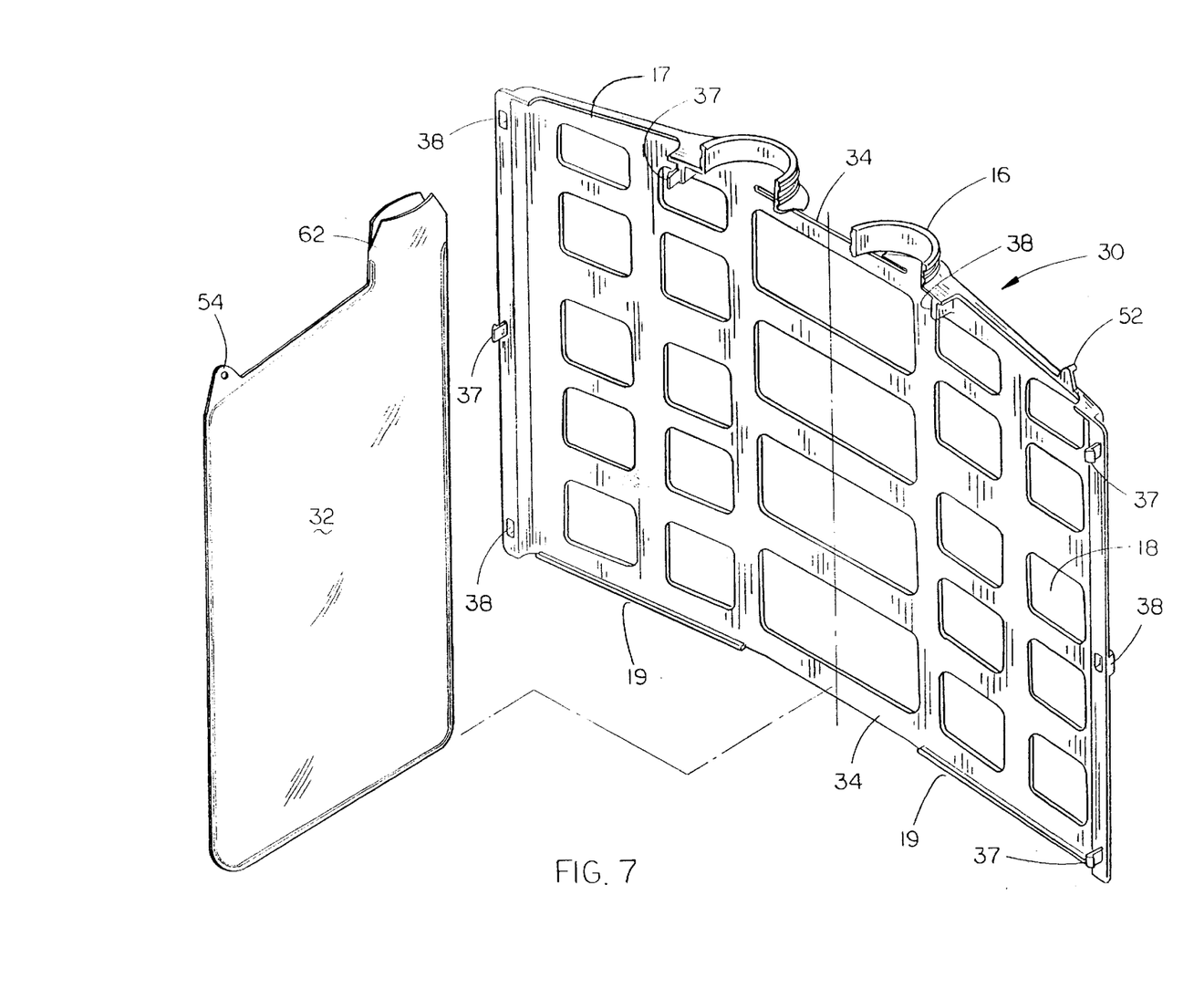
FIG. 7 is a perspective view of a second embodiment of the invention, with the liner-holder in the open configuration.
Figure 8:
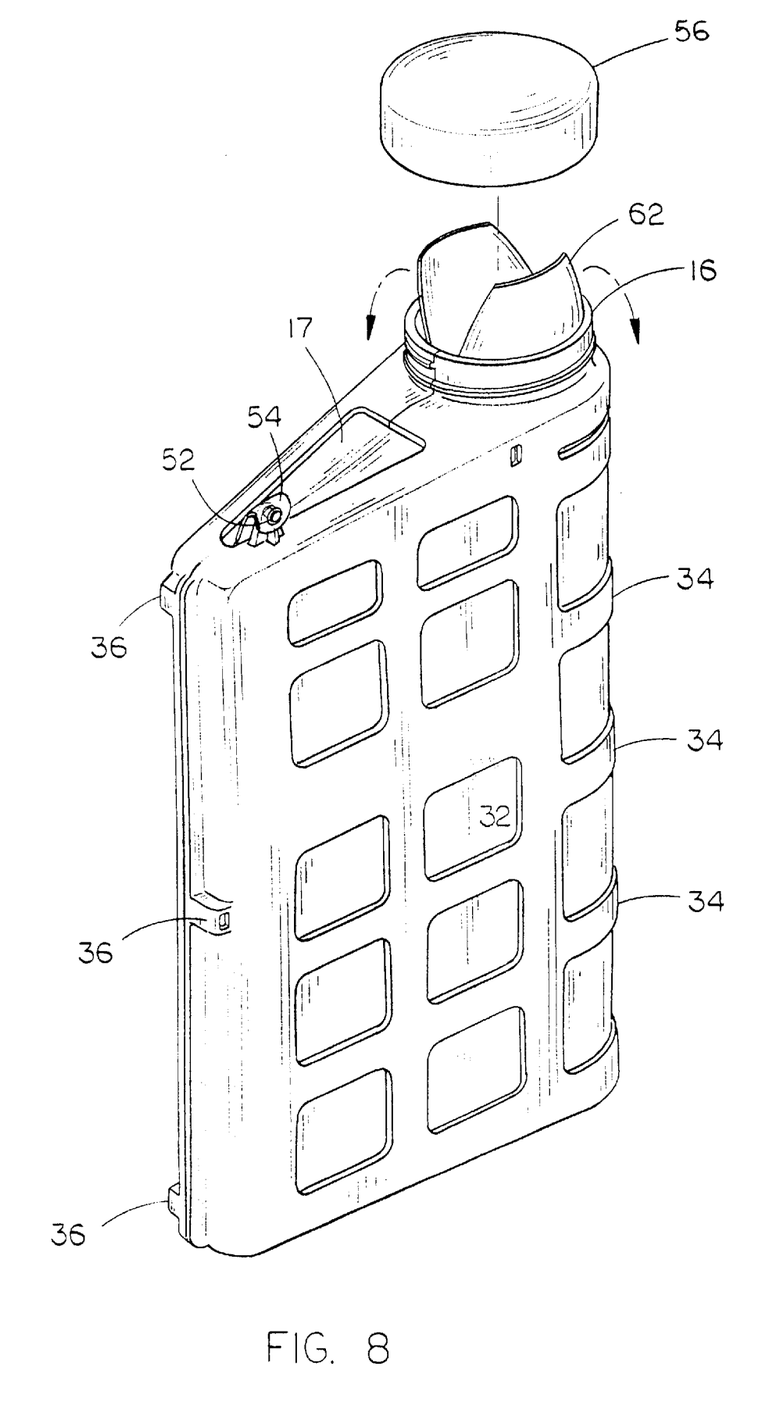
FIG. 8 is a perspective view of the second embodiment with the liner-holder closed and containing a disposable liner.

A second embodiment of the sample storage device is depicted in FIGS. 7 and 8, and comprises a liner-holder 30 and disposable liner 32. The liner-holder 30 is molded in the open configuration of FIG. 7, but is then folded along hinge straps 34 into the wedge shaped, closed configuration of FIG. 8. The liner-holder 30 is held in the closed configuration by means of three bayonet clips 36 spaced along the narrow side of the wedge shaped liner-holder 30 and a fourth bayonet clip 36 adjacent the neck section 16, each bayonet clip 36 including a bayonet 37 and bayonet receiver 38. The liner-holder 30 further includes a liner support hook 52 extending from the top of the liner-holder 30 and adjacent its upper vent hole 17. It is anticipated that the liner-holder 30 of the second embodiment will generally be left in the closed configuration. In operation, the liner 32 would then be inserted through either the top vent 17 or lower vent 19, with the liner neck 62 then folded down over the holder neck section 16 and the apertured support tab 54 hooked over the support hook 52. After sample collection is complete, a cap 56 may be screwed onto the neck 16 for transportation of the sample.

Figure 9:
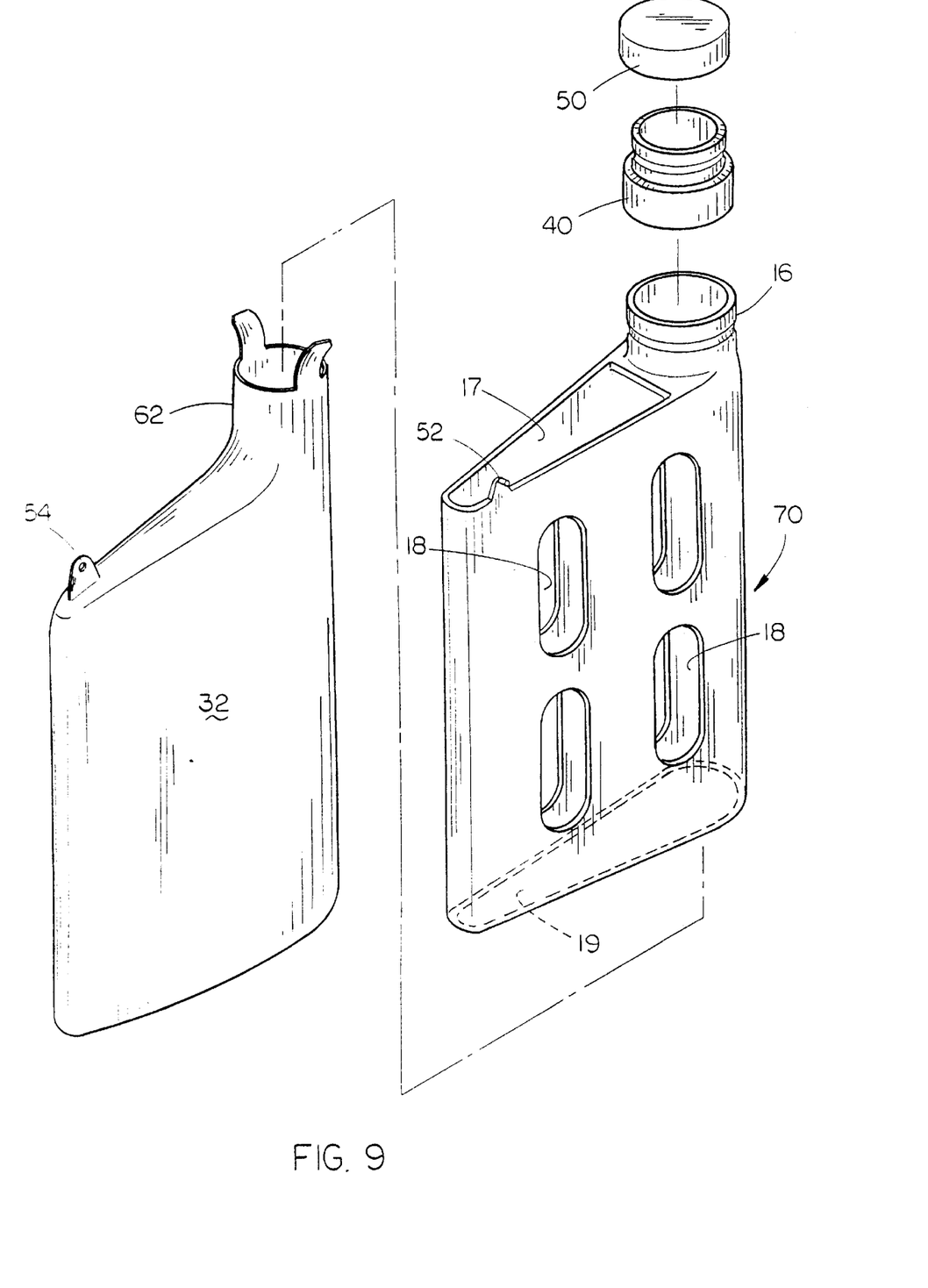
FIG. 9 is a perspective view of a third embodiment of the invention.

A third embodiment of the invention is depicted in FIG. 9 which also comprises a wedge shaped holder 70 and liner 32. As is readily apparent, this embodiment is molded into a closed position and therefore requires insertion of the liner 32 through either the top vent 17 or bottom vent 19 as is envisioned for the second embodiment. After the liner 32 is inserted into the liner-holder 70, it is suspended in place by attaching support tab 54 over support hook 52 and folding the liner neck section 62 down over the holder neck section 16. A retainer 40 may be used as required and the neck section 16 may or may not be threaded, as desired.

Although three exemplary embodiments of the invention have been described in detail above, those skilled in the art will readily appreciate that many modifications are possible without materially departing from the novel teachings and advantages of this invention. Accordingly, all such modifications are intended to be included within the scope of this invention as defined in the following claims.

In the claims, means-plus-function clauses are intended to cover the structures described herein as performing the recited function and not only structural equivalents but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A liquid sample storage device, comprising:
   (a) a liner-holder having a first wall and a second wall interconnected by a flexible hinge, permitting relative movement of said walls between a generally planar, open configuration and a wedge-shaped, closed configuration, said wedge-shaped closed configuration having an open top and an open bottom, said top including a neck forming an inlet into said closed liner-holder;
   (b) a flexible liner removably contained within said closed liner-holder;
   (c) first and second means for suspending said liner within said closed liner-holder wherein said first means is associated with said neck and said second means is spaced from said first means and associated with the open top of the liner holder; and
   (d) third means for releasably locking said liner-holder in said wedge-shaped closed configuration.

2. The device as recited in claim 1 wherein said hinge comprises a plurality of spaced-apart hinge straps.

3. The device as recited in claim 1 wherein said suspension means comprises an elongated neck and a support tab extending from an upper edge of said liner, and a support hook extending from said top of said liner-holder remote from said neck.

4. The device as recited in claim 1 wherein said open bottom and open top both define vent openings.

5. The device as recited in claim 4 wherein at least one of the vent openings is dimensioned to receive said flexible liner.

6. The device as recited in claim 4 wherein both of said vent openings are dimensioned to receive said flexible liner.

\* \* \* \* \*